Jan. 23, 1968  A. R. McCLOSKEY  3,365,249

SPHERICAL BEARING

Filed Sept. 17, 1965

INVENTOR.
ALBERT R. McCLOSKEY
BY
Davis, Hoxie, Faithfull & Hapgood
ATTORNEYS.

United States Patent Office 3,365,249
Patented Jan. 23, 1968

3,365,249
SPHERICAL BEARING
Albert R. McCloskey, Fairfield, Conn., assignor to The Heim Universal Corporation, Fairfield, Conn., a corporation of Connecticut
Filed Sept. 17, 1965, Ser. No. 489,464
3 Claims. (Cl. 308—72)

ABSTRACT OF THE DISCLOSURE

The invention relates to spherical bearings having an outer member which includes a removable key portion and an inner member which is partially spherical. When assembled, the inner and outer members are characterized by complete bearing surfaces.

My invention relates to spherical, or ball-and-socket, bearings.

A commonly used spherical bearing has an outer member with flat sides and a spherical inner surface, as for example, a flattened rod end; and an inner member, with flat sides parallel to the flat sides of the outer member, and a spherical outer surface mating with the inner surface of the outer member. One well-known process of manufacturing these bearings includes machining a slot in the outer member, the slot extending radially outward from the inner surface of the outer member, the slot also extending from flat side to flat side of the outer member, then turning the flat-sided inner member endwise with respect to the outer member, then inserting the inner member into the slot in the outer member, then moving the inner member upward from the bottom of the slot so that the mating spherical surfaces of the members are in bearing relation, and turning the inner member so that its flat sides are parallel to the flat sides of the outer member. Another process of manufacturing these bearings includes machining cylindrical flats on the spherical surface of the inner member at points diametrically opposed to each other, then turning the inner member endwise with respect to the outer member, then inserting the inner member into the outer member with the flats parallel to the path of insertion, and then turning the inner member so that its flat sides are parallel to the flat sides of the outer member. The first-mentioned process encounters the difficulty that the spherical inner surface of the outer member is incomplete because of the slot and the bearing cannot withstand heavy loads because of this incomplete surface. The second-mentioned process encounters the difficulty that the spherical outer surface of the inner member is incomplete because of the flats, and again the bearing cannot withstand heavy loads because of this incomplete surface. It is an objective of this invention to provide a bearing with both inner and outer members having complete surfaces.

According to my invention this objective is met by a bearing construction as described below. In the drawings.

Figure 1:
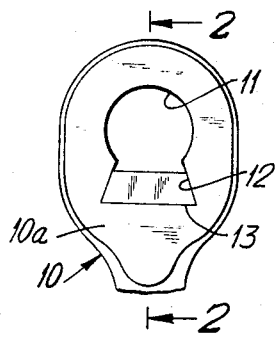
FIG. 1 is an elevation view of an outer member of a bearing made according to the first step of my invention and having a key inserted in a keyway.
Figure 2:
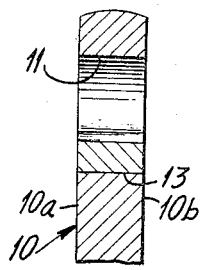
FIG. 2 is a section view along the line 2—2 of FIG 1.

FIGS. 1 and 2 show an outer member 10 with flat sides 10a and 10b and a cylindrical hole 11 drilled through the member 10 perpendicular to its sides according to the first step of my process. The hole has a smaller diameter than any part of the hole is to have in the finished bearing. FIG. 1 also shows a dovetail keyway 12 with sides extending outward and downward from the hole. The sides and bottom of the keyway extend axially from side 10a to side 10b and the sides and bottom are perpendicular to the sides 10a and 10b. The sides and bottom of the keyway are flat. A key 13, with flat sides and bottom coextensive with the sides and bottom of the keyway 12, is inserted in the keyway 12.

Figure 3:
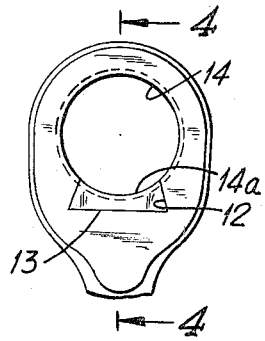
FIG. 3 is an elevation view of the outer member and the key of FIG. 1 made according to the second step of my invention.
Figure 4:
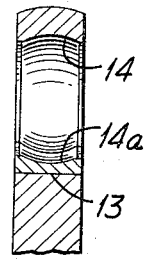
FIG. 4 is a section along the line 4—4 of FIG. 3.
Figure 5:
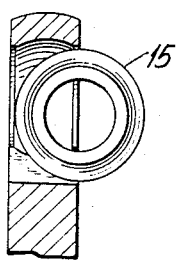
FIG. 5 shows the same outer member in section with the key removed with an inner member being inserted into the outer member.

According to the next step of my invention (see FIGS. 3 and 4) the hole 11 is machined with the key 13 in place to form a larger hole 14 in final form, with the surface of the hole 14, that is, the inner surface of the outer member, concave and spherical with the top surface 14a of the key concave and spherical so that it corresponds with the inner surface of the outer member. The key is then removed (see FIG. 5) and an inner partially spherical member 15 with flat sides 15a and 15b is inserted in the opening, the opening now being enlarged by removal of the key to include not only the hole 14 but also the empty keyway 12.

Figure 6:
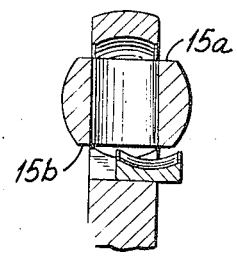
FIG. 6 shows the same outer member and the same inner member after the inner member has been inserted and rotated to make room for insertion of the key and it also shows the key in the process of being inserted.
Figure 7:
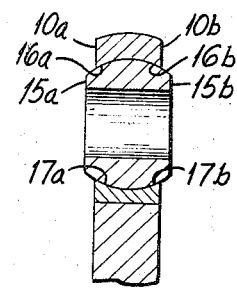
FIG. 7 shows the outer member, the key and the inner member of FIG. 6 has been rotated to its final position.

According to the next step (see FIG. 6) the inner member 15 is raised out of the keyway and rotated to permit the insertion of the key 13 in the keyway 12, and key 13 is inserted in the keyway 12. In the final step (see FIG. 7) the inner member 15 is then rotated so that its flat sides 15a and 15b are parallel to the flat sides 10a and 10b of the outer member. As a result, the inner member is held in the outer member because its spherical surface impinges against the constricted portions 16a and 16b of the outer member and the key is held in the outer member because its shoulders 17a and 17b impinge against the spherical surface of the inner member.

Figure 8:
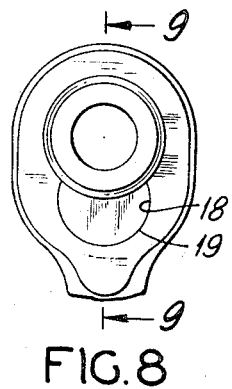
FIG. 8 shows an alternative to the form shown in FIG. 7.
Figure 9:
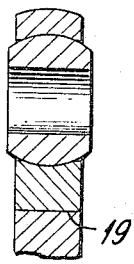
FIG. 9 shows a section of the alternative along the line 9—9 of FIG. 8.

In the alternative shown in FIGS. 8 and 9 there is a keyway 18 and a corresponding key 19 which are rounded to eliminate strains due to notch effect. Otherwise the alternative of FIGS. 8 and 9 is the same as that of FIG. 7.

I claim:

1. A spherical bearing comprising an outer member having flat sides and a hole extending from side to side, the surface of the hole being concave and spherical so that the outer member has constricted portions at each side, the outer member also having a walled keyway extending downward from the hole and extending axially from side to side of the outer member perpendicular to the sides of the outer member; a walled key in the keyway co-extensive with the keyway, the key also having a concave and spherical top surface corresponding to the surface of the hole so that the key has shoulder portions corresponding to the constricted portions of the outer member; and a partially spherical inner member having flat sides, the inner member being held in the outer member by impingement of the spherical surface of the inner member against the constricted portions of the outer member and the key being held in the outer member by impingement of the shoulder portions of the key against the spherical surface of the inner member.

2. A bearing as claimed in claim 1 in which the key has a cross-section the lower part of which is in the form of a base of a triangle.

3. A bearing as claimed in claim 1, in which the key has a cross-section in the form of part of a circle.

References Cited

UNITED STATES PATENTS

| 2,047,885 | 7/1936 | Riebe | 308—29 |
| 2,400,506 | 5/1946 | Heim | 308—72 |

MARTIN P. SCHWADRON, *Primary Examiner.*

R. A. DUA, *Assistant Examiner.*